United States Patent Office 3,277,154
Patented Oct. 4, 1966

3,277,154
PRODUCTION OF NAPHTHALENE DICARBOXYLIC ACID ESTERS BY THE OXIDATION AND SUBSEQUENT ESTERIFICATION OF DIMETHYL-NAPHTHALENE
William D. Vanderwerff, Wilmington, Del., assignor to Sun Oil Company, Philadelphia, Pa., a corporation of New Jersey
No Drawing. Filed Sept. 28, 1962, Ser. No. 227,089
9 Claims. (Cl. 260—475)

This invention relates to a process for the production of valuable derivatives of dimethylnaphthalenes, and more particularly to an improved method for the production of dicarboxylic acid ester and half acid ester derivatives from dimethylnaphthalenes which are useful in the preparation of valuable polymeric substances.

It is known to prepare dicarboxylic acid derivatives from dimethylnaphthalenes in a one-step process by contacting the dimethylnaphthalene starting material with $NO_2$ and selenium dioxide in the presence of a solvent which is inert to $NO_2$, preferably trichlorobenzene. Such a process, however, is characterized by the fact that, first of all, substantial amounts of expensive selenium, which is difficult to recover from the reaction mixture, must be employed, and second, that the product obtained consists of a mixture of the dicarboxylic acid derivative (hereinafter referred to as the "diacid"), and an intermediate acid aldehyde by-product (hereinafter referred to as the "aldacid"), generally in proportions of 80–85% diacid, 10–15% aldacid, and 5–10% other impurities. While it is known to oxidize the aldacid by treating the reaction mixture with oxidizing agents such as NaOCl to raise the over-all yield of diacid to about 90–92%, nevertheless such a process has been found to be generally undesirable because the NaOCl treatment is extremely costly and wasteful, and also because the resulting impurities not only make such a separation extremely difficult, and thus lower the yield of desired end-product, but also because these impurities often impart to the over-all product a most undesirable color ranging from dark grey to reddish-orange which is carried through to the resulting polymer. The nature of these impurities, namely nitrated products, indicates also that the reaction conditions employed result in material loss of solvent and $NO_2$ in addition to dimethylnaphthalene starting materials.

It is, therefore, an object of this invention to provide a process for the conversion of dimethylnaphthalenes to the corresponding dicarboxylic acids and esters thereof in high yield and in substantially pure form.

It is a further object of this invention to provide a method whereby dicarboxylic acid esters of naphthalenes may be prepared using less amount of expensive reagents and under more manageable reaction conditions than has heretofore been possible.

It has now been found that these and other objects of this invention may be achieved by reacting the dimethyl-naphthalene starting material with $NO_2$ and selenium dioxide in the presence of a solvent which is inert to $NO_2$ in order that a mixture of the diacid and the aldacid is formed in quantitative amounts; esterifying this mixture of reaction products, preferably with an esterifying agent in which the resulting diester is insoluble, to form the corresponding dicarboxylic diester (hereinafter referred to as the "diester"), and the aldehyde ester (hereinafter referred to as the "aldester"), while simultaneously selectively crystallizing and recovering the diester and leaving the aldester in solution; recovering the aldester from the filtrate by crystallizatiton from or extraction with a suitable solvent, and oxidizing it with $NO_2$ in the presence of a solvent which is inert to $NO_2$, preferably in the absence of selenium dioxide, and at a temperature lower than that employed in the first oxidation step, to form the corresponding half acid ester, and esterifying the half acid ester to form the desired diester in substantially quantitative yields. If desired, the aldester or diester may be hydrolyzed, as for example with an alkali metal hydroxide such as sodium or potassium hydroxide, to form the respective aldacid or diacid in pure form.

The starting materials employed in accordance with the present invention are known dimethylnaphthalene isomers such as 2,6-dimethylnaphthalene; 2,7-dimethylnaphthalene; 1,5-dimethylnaphthalene; 1,8-dimethylnaphthalene and the like.

The solvent employed in both the first and second oxidation steps must be inert to $NO_2$ at the elevated temperature used in these reactions, and may be the same or different solvents, although it is preferable that the same solvent be used for both the starting materials and the aldester for simplicity of operation. Chlorinated benzenes having from 1 to 4 chlorine atoms are suitable, and particularly trichlorobenzene. However, depending upon the range of reaction conditions, other solvents such as nitrobenzenes, ethers such as diphenyl ether or chlorinated ethers and the like may also be employed.

In the first step of the present process, the reaction conditions should be carefully regulated in order that a mixture of diacid and aldacid be produced in a ratio of about 1:1 by weight and desirably with formation of more of the aldacid than diacid up to a ratio of about 4:1 of aldacid to diacid. As described in detail hereinbelow, these ratios are regulated by the concentration of starting material and selenium dioxide, and more particularly by the amount of $NO_2$ used: the less the amount of $NO_2$, the more aldacid there is obtained.

Thus, in accordance with this process, dimethyl-naphthalene, dissolved in a suitable solvent, is first reacted with $NO_2$ in the presence of selenium dioxide at a temperature of from about 180–215° C. and preferably from about 190–200° C. The selenium may be added to the reaction mixture as the dioxide, or as $H_2SeO_3$ dissolved in $H_2O$; alternatively, it may be prepared in situ in the reaction vessel by bubbling $NO_2$ gas through the solvent in the presence of selenium metal, preferably prior to the addition of the dimethylnaphthalene, until the selenium is oxidized to the dioxide. Whereas heretofore the single-stage oxidation of dimethylnaphthalenes had required from approximately two to ten parts by weight of selenium to convert 100 parts by weight of a dimethyl-naphthalene to the diacid in 85 mole percent yield, it has now been found that the first oxidation step of the present process requires as little as about 0.5 part by weight of selenium to quantitatively convert 100 parts by weight of dimethylnaphthalene to a diacid-aldacid mixture. Since the subsequent oxidation of the aldester to the half acid ester requires no selenium whatsoever to obtain virtually quantitative conversion, it is indeed surprising that by the present process almost quantitative yields are obtained with as low as one-twentieth the amount of this reagent heretofore found necessary. Thus, while larger amounts of selenium may be employed, the ratio of metallic selenium to starting material should most desirably be about 1:150 to 1:200 by weight. It has also been found, in accordance with the present invention, that only about 300 ml. to 800 ml., and preferably about 500 ml. of solvent is necessary per 100 parts by weight of starting material whereas in the past from about two to five times that amount was needed. This is true not only of the first oxidation step but also the second oxidation step as well, thereby effecting a substantial savings in solvent over that employed in the past. Significantly, it has been found that in addition to employing less solvent, under the conditions of this reaction very little of the solvent is degraded into $CO_2$ or other by-products as is true in a one-stage oxidation, thus effecting additional savings of solvent.

In addition to regulating the ratio of starting material to solvent and selenium dioxide, the amount of $NO_2$ employed in the first oxidation step should also be controlled in such a way that $NO_2$ utilization is as nearly stoichiometric as possible. This is conveniently achieved by bubbling the $NO_2$ through the solution at such a rate that the off-gases remain colorless, thereby indicating that all the $NO_2$ is consumed. The termination point of the reaction is then readily determined by the existence of brown $NO_2$ in the off-gases rather than the colorless NO off-gas, thus indicating that $NO_2$ is no longer being reduced. The reaction mixture is then cooled, as for example with a heat exchanger and a cooler, or with a stream of nitrogen, washed with an inert organic solvent such as benzene, pentane, acetone, or the like and dried to yield a mixture of diacid and aldacid. This mixture will generally contain from about 40–75% by weight of the aldacid and correspondingly from 25–60% of the diacid.

The esterification of the diacid-aldacid reaction mixture is most conveniently carried out with a low molecular weight alcohol containing from 1 to 5 carbon atoms to form the corresponding diester and aldehyde ester mixture. Thus, for example, such esterifying agents as methanol, ethanol or propanol may be suitably employed. The reaction is conveniently carried out in a steel or glass-lined bomb, or other suitable equipment, at a temperature of from about 130–175° C., depending upon the agent employed, and preferably from about 145–150° C. Although not essential, it is desirable that a small amount of mineral acid such as hydrochloric or sulfuric acid be present during the esterification reaction. Since it is essential that the resulting diester-aldester mixture be separated, preferably by selective crystallization of the diester, it has been found that the lower molecular weight alcohols are particularly effective esterifying agents because the diesters are insoluble in the alcohol while the aldesters are completely soluble, thereby effecting substantially complete separation of the mixture. Therefore, when a low molecular weight alcohol is employed as the esterifying agent, an excess of this reagent must be used in order that it may also act as a selective crystallization solvent. Alternatively, however, separation may be effected subsequent to esterification, employing such solvents as benzene, toluene, acetone or the like in which the diester is insoluble. The aldester is then readily recovered by filtration of the reaction mixture to give the diester solid, substantially free of impurities, followed by pouring the filtrate into an excess of water, in which the aldester is insoluble, and filtering and drying the precipitated aldester. Alternatively, the aldester may be extracted from the filtrate with the solvent to be employed in the next step, preferably trichlorobenzene. In practice, small amounts of the diester may be recovered with the aldester but further separation is not necessary since the diester can readily be passed through subsequent oxidation and esterification steps unchanged and thereafter recovered.

While the oxidation of the aldester of the naphthalene to the half acid ester can be carried out under the same reaction conditions under which the dimethylnaphthalene oxidation is conducted, in which case the aldester is advantageously recycled to the first oxidation reactor, it has been found that a purer product and a substantial saving of selenium dioxide can be effected when the aldester is oxidized with $NO_2$ in a separate reactor in the absence of selenium and at lower temperatures. Thus, it has been found that by bubbling $NO_2$ through a solution of aldester dissolved in trichlorobenzene at a temperature of about 90°–130° C., and preferably at 100° C., substantially quantitative yields of acid ester are recovered, free from the usual colored impurities. The completion of the oxidation is most conveniently determined by periodic vapor phase chromatographic analysis or other suitable means.

The resulting half acid ester may then be further esterified to form the desired diester end product. This esterification is most readily carried out in the same manner in which the diacid-aldacid esterification is conducted. Although a separate reactor may thus be employed, more advantageously, in a continuous or batch process, the acid ester is passed into the first esterification reactor with the diacid-aldacid mixture and thereafter removed as the diester with the rest of the precipitated diester.

The diesters of the two oxidation-esterification stages may, if desired, be further purified by known crystallization methods, as for example by crystallization from toluene, or by a combination of a distillation and a crystallization step.

The following examples are given by way of illustration and are not to be regarded as limitations of this invention:

EXAMPLE 1

One liter of trichlorobenzene and 2 grams of selenium are charged to a three-liter cylindrical reactor equipped with a high-speed turbine stirrer and baffles. The solution is heated to 195° C., nitrogen dioxide is passed through to oxidize the selenium, and a solution of 400 grams of 2,6-dimethylnaphthalene in one liter of hot trichlorobenzene is rapidly added. Nitrogen dioxide is then bubbled through the solution at a rate of about one gram per minute for 160 minutes at 200° C. at which time the reaction is complete as indicated by brown colored off-gases. The reaction mixture is then cooled under a stream of nitrogen, filtered and washed with benzene, followed by pentane, to yield 515.7 grams of cream-colored solids containing 194.4 grams of 2,6-naphthalene dicarboxylic acid (37.7 mole percent) and 321.3 grams (62.3 mole percent) of 6-formyl-2-naphthoic acid.

In accordance with the foregoing procedure, but starting with 1,8-dimethylnaphthalene, there is obtained a mixture of the corresponding 1,8-naphthalene dicarboxylic acid and 8-formyl-1-naphthoic acid.

EXAMPLE 2

100 grams of the crude oxidation mixture obtained in Example 1 is charged to a glass-lined bomb with one liter of methanol and 5 ml. of 85% sulfuric acid. The bomb is heated to 145–150° C. for two hours, developing a pressure of 125 p.s.i.g. Filtration of the cold reaction mixture gives a solid which is 95% dimethyl 2,6-naphthalene dicarboxylate which is off-white in color, and a filtrate which contains 6-carbomethoxy-2-naphthaldehyde of 95% purity. The latter is isolated by pouring the filtrate into an excess of water and filtering off and drying the precipitated 6-carbomethoxy-2-naphthaldehyde.

Treatment of the resulting dimethyl 2,6-naphthalene dicarboxylate with a solution of sodium hydroxide yields 2,6-naphthalene dicarboxylic acid.

In accordance with the foregoing procedure, but starting with a mixture of 1,8-naphthalene dicarboxylic acid and 8-formyl-1-naphthoic acid, there is obtained a mixture of the corresponding dimethyl 1,8-naphthalene dicarboxylate and 8-carbomethoxy-1-naphthaldehyde.

EXAMPLE 3

400 grams of the crude 6-carbomethoxy-2-naphthaldehyde and 2 liters of trichlorobenzene are charged to the reactor described in Example 1, and heated to 100° C. The nitrogen dioxide is bubbled through at a rate of one gram per minute until all of the aldester has been oxidized as determined by periodic vapor phase chromotographic analysis of samples. The reaction mixture is then cooled under a stream of nitrogen and filtered to yield 320 grams of 6-carbomethoxy-2-naphthoic acid. Dilution of the trichlorobenzene filtrate with an excess of pentane gives an additional 68 grams of the product.

In accordance with the foregoing procedure but starting with 8-carbomethoxy-1-naphthaldehyde, there is obtained the corresponding 8-carbomethoxy-1-naphthoic acid.

EXAMPLE 4

200 grams of 6-carbomethoxy-2-naphthoic acid is charged to a glass-lined bomb with one liter of methanol and 5 ml. of 85% sulfuric acid. The bomb is heated to 145° C. for two hours developing a pressure of 100 p.s.i.g. At the end of this period, the bomb is cooled and the contents filtered and dried to yield 205 grams of dimethyl 2,6-naphthalene dicarboxylate which is off-white in color.

EXAMPLE 5

1200 ml. of trichlorobenzene, 156.0 grams of 2,7-dimethylnaphthalene and one gram of selenium are charged to a three-liter cylindrical reactor equipped with a high-speed stirrer and baffles. The solution is heated to 185° C., and 254 grams of nitrogen dioxide are introduced at a uniform rate of about 1.5 grams per minute for a period of 177 minutes at which time completion of the reaction is indicated by the brown colored off-gases. The reaction mixture is cooled with a stream of nitrogen, filtered and washed with benzene followed by pentane to yield 200.6 grams of cream colored solids containing 112 grams (56 mole percent) of 7-formyl-2-naphthoic acid and 88.6 grams (41 mole percent) of 2,7-naphthalene dicarboxylic acid.

In accordance with the foregoing procedure, but starting with 1,5-dimethylnaphthalene, there is obtained a mixture of the corresponding 5-formyl-1-naphthoic acid and 1,5-naphthalene dicarboxylic acid.

EXAMPLE 6

The 200.6 grams of crude reaction product obtained in Example 5 is esterified in twenty small Hoke bombs using 10 grams of product, 0.5 ml. of 85% sulfuric acid, and 100 ml. of methanol in each bomb. The bombs is heated to 145° C. for two hours, developing a pressure of 100 p.s.i.g. At the end of this time the bombs are cooled and the contents are emptied into two liters of water, filtered, and dried to yield 197.3 grams of product. The dry esters contain 107.0 grams (50 mole percent) of 7-carbomethoxy-2-naphthaldehyde and 90.3 grams (37 mole percent) of dimethyl 2,7-naphthalene dicarboxylate which is off-white in color.

The mixed esters are crystallized from toluene from which 21 mole percent of the diester is removed leaving 50 mole percent of the aldester and 16 mole percent of the diester to be charged to the second oxidation.

In accordance with the foregoing procedure, but starting with a mixture of 5-formyl-1-naphthoic acid and 1,5-naphthalenedicarboxylic acid, there is obtained a mixture of the corresponding dimethyl 1,5-naphthalene-dicarboxylate and 5-carbomethoxy-1-naphthaldehyde.

EXAMPLE 7

128.6 grams of the crude esters (50 mole percent aldester and 16 mole percent diester) obtained in Example 6 are added to 1200 ml. of trichlorobenzene in the three liter reactor described in Example 5 and heated to 130° C. 34 grams of nitrogen dioxide is bubbled uniformly over 60 minutes through this mixture. The reaction mixture is cooled under a stream of nitrogen and filtered to give 140.1 grams of mixed esters. These esters are filtered from the trichlorobenzene solution and dried to yield 103.5 grams (45 mole percent) of 7-carbomethoxy-2-naphthoic acid and 36.6 grams (15 mole percent) of dimethyl 2,7-naphthlenedicarboxylate.

In accordance with the foregoing procedure, but starting with a mixture of dimethyl 1,5-naphthalenedicarboxylate and 5-carbomethoxy-1-naphthaldehyde, there is obtained a mixture of 5-carbomethoxy-1-naphthoic acid and dimethyl 1,5-naphthalenedicarboxylate.

EXAMPLE 8

The mixture of acid esters and diesters obtained in Example 7 are treated in 14 small Hoke bombs in the manner described in Example 6 to yield 57 mole percent of diester. Together with the 21 mole percent removed from the toluene crystallization of Example 6, this gives a total over-all yield of 190.3 grams (78 mole percent) of off-white colored dimethyl 2,7-naphthalene dicarboxylate, based on starting material.

In accordance with the foregoing procedure, but starting with a mixture of 5-carbomethoxy-1-naphthoic acid and dimethyl 1,5-naphthalene dicarboxylate, there is obtained dimethyl 1,5-naphthalene dicarboxylate.

It will be noted that the over-all synthesis disclosed in Examples 5–8 yielded substantially less product than anticipated, but this loss of product can be attributed almost entirely to the inefficiency resulting from the use of many small bombs on bench scale rather than one large bomb or like equipment ordinarily employed in this type of reaction.

The following examples, Examples 9–13, are set forth to illustrate the effectiveness of applicant's novel two-stage oxidation process in the large-scale conversion of 2,6-dimethylnaphthalene to the corresponding dicarboxylic acid ester. In contrast thereto, the single-stage oxidation of the same material in large scale, as shown in Example 14, points up the decided disadvantages of this other method, both in terms of the excessive amounts of selenium and $NO_2$ used, as well as the poor yield of naphthalene carboxylic acid obtained, both quantitatively (80%), and qualitatively (dark-grey colored material).

EXAMPLE 9

1300 pounds of trichlorobenzene, 150 pounds of 2,6-dimethylnaphthalene and 0.75 pound of selenium are charged to a 150 gallon reactor, cylindrical about its vertical axis, with four sidewall baffles and 470 r.p.m. 3-bladed propeller agitator. The contents are heated to 195 C., nitrogen dioxide gas is bubbled through the reaction medium at about 50 pounds per hour for 250 minutes at which time the off-gases just barely turn brown indicating the rate of reaction is slowing down. The nitrogen dioxide rate is then adjusted downward until the gas is colorless. The procedure is repeated again when the gas again shows a brown tinge. The process is regulated in this manner for approximately 45 minutes with the final result that the off-gas cannot be decolorized without shutting the nitrogen dioxide off completely. At this point the reaction is over and approximately 240 pounds of $NO_2$ have been charged. The reaction mixture is then cooled by circulating water through a cooling jacket and filtered to yield 198 pounds of solids consisting of 79 pounds of 2,6-naphthalene dicarboxylic acid (38.1 mole percent), 116 pounds of 6-formyl-2-naphthoic acid (60.1 mole percent), 2 pounds of 6-methyl-2-naphthoic acid (1.1 mole percent) and 4 pounds of unidentified material (1.8 mole percent). The solids are washed with methanol which removes the unidentified material along with 0.5 pound of dicarboxylic acid and 3 pounds of formyl-naphthoic acid.

Over-all yields of this step is 100 mole percent of which 98 mole percent is carboxylic acids. The product is dark cream colored.

EXAMPLE 10

The methanol-washed solids from the previous example are combined with additional solids produced in similar manner to the preceding example, to make up 451 pounds of solids containing 271 pounds of 6-formyl-2-naphthoic acid and 180 pounds of 2,6-naphthalene dicarboxylic acid. These solids, along with 3470 pounds of methyl alcohol, and 44 pounds of 86% sulfuric acid are charged to 1,000 gallon agitated stainless steel reactor. The contents are heated to 110–120° C. and held at this temperature for 240 minutes. During this period reactor pressure rises to approximately 150 p.s.i.g. due to the vapor pressure of the components. The reactor contents are then cooled to approximately ambient temperature, filtered, and washed with methanol. The methanol-washed filtrate is charged to the next subsequent esterification. Using the procedure described in this example, 176 pounds of methanol-washed solids are produced composed of 174 pounds of the diester, dimethyl 2,6-naphthalene dicarboxylate, and 2 pounds of the aldehyde ester, 6-carbomethoxy-2-naphthaldehyde. The filtrate contains 30 pounds of diester and 288 pounds of aldester.

Over-all yield of this step is 100 mole percent. The solid product is light grey.

EXAMPLE 11

The filtrate from the preceding example is combined with other filtrates produced in a similar manner and an aliquot portion extracted with trichlorobenzene. 2009 pounds of methanol filtrate containing 124 pounds of aldehyde ester and 16 pounds of diester is charged to a stirred tank. 1361 pounds of trichlorobenzene is added. The contents are heated to 65° C. and held at this temperature until 1570 pounds of methanol have boiled off. The heat input is then shut off and 250 pounds of water added. This results in a water-alcohol phase on top of a trichlorobenzene-ester phase. The water-alcohol phase is drawn off and remaining trichlorobenzene phase heated to 80° C. in preparation for charging to the oxidation step. Using the procedure in this example, the aldehyde ester, 6-carbomethoxy-2-naphthaldehyde, and the diester, dimethyl 2,6-naphthalene dicarboxylate, are quantitatively extracted into the trichlorobenzene.

Over-all yield in this step is 100 mole percent.

EXAMPLE 12

The trichlorobenzene extract from the previous example is combined with the trichlorobenzene extracts obtained in a similar manner and an aliquot oxidized. 1502 pounds of trichlorobenzene solution containing both aldehyde ester and diester is charged to the same reactor used in Example 9. This solution contains 125 pounds of aldehyde ester and 16 pounds of diester. The reactor contents are heated to 130° C. and $NO_2$ gas bubbled through the solution at a rate of about 15 pounds per hour until substantially all the aldehyde ester, 6-carbomethoxy-2-naphthaldehyde, has been oxidized to the acid ester, 6-carbomethoxy-2-naphthoic acid. The reactor content is then cooled down to ambient temperature using a cooling water jacket. The slurry is filtered to yield solids containing 115 pounds of acid ester and a trace of unoxidized aldehyde ester (approximately 0.1 pound). The trichlorobenzene filtrate contains the 16 pounds of diester charged plus a trace of unconverted aldehyde ester. Solution of the filtrate with an excess of pentane yields the desired acid ester, 6-carbomethoxy-2-naphthoic acid.

Over-all yield of this step is 88.5 mole percent. The solid product is off-white in color.

EXAMPLE 13

49.5 pounds of the acid ester, 6-carbomethoxy-2-naphthoic acid, from the previous example are charged to a 50-gallon stainless steel agitated reactor along with 189 pounds of methanol and 2.5 pounds of 80% $H_2SO_4$. The reactor contents are heated to 120° C. and maintained between the temperature and 11° C. for 120 minutes. During this period, pressure is 68–86 p.s.i.g. due to the vapor pressure of the components. The reaction mixture is then cooled to ambient temperature using a cooling water jacket.

The slurry is filtered and washed with methanol. The wash methanol filtrate is used as part of the esterifying methanol for a subsequent similar esterification. Using the procedure in this example, 51.5 pounds of diester solids are produced and the filtrate contains about 0.5 pounds of the diester, dimethyl 2,6-naphthalenedicarboxylate.

Over-all yield of this step is 98.5 mole percent. The solid product is off-white in color.

EXAMPLE 14

Single stage oxidation 102 pounds of trichlorobenzene and 0.187 pounds of selenium are charged to a 20-gallon glass-lined jacketed reactor equipped with 8 stainless steel baffles and a 360 r.p.m. 10″ turbine agitator. Reactor contents are heated to 188° C. at which point gaseous nitrogen dioxide is bubbled through the reactor contents at approximately 3-pound-per-hour rate for 43 minutes. During this period of time, selenium is oxidized to selenium dioxide while reactor temperature is increased to 195° C. At this point a pump is started to the reactor from a steam traced charge tank containing 18 pounds of 2,6-dimethyl-naphthalene dissolved in 48 pounds of trichlorobenzene at approximately 80° C. Pump rate is maintained at 2.1 to 2.5 pounds per hour of 2,6-dimethylnaphthalene for 470 minutes during which interval all the contents of the charge tank have been charged. During this period when dimethylnaphthalene is being charged, nitrogen dioxide is bubbled continuously through the reactor at a rate of 4.9 to 5.7 pounds per hour and vent gases are brown indicating unconverted $NO_2$. At the point when all 2,6-dimethylnaphthalene has been charged, 54.5 pounds of $NO_2$ have been chraged or an excess of 32% over the theoretical requirement for conversion to diacid. During the period when dimethylnaphthalene is being charged, 0.099 pound of selenium are flushed into the reactor by 3 pounds of trichlorobenzene at each of the following times, with time zero as the start of dimethylnaphthalene to the reactor: 60 minutes; 120 minutes; 180 minutes; 240 minutes; 300 minutes; 360 minutes; 420 minutes and 460 minutes. Thus, total quantity of selenium charged including the initial 0.187 pound is 0.979 pound or 5.4 wt. percent of the 2,6-dimethylnaphthalene charged. When all dimethylnaphthalene has been charged, nitrogen dioxide is continued through the reactor for 120 minutes and then shut off. The reactor is purged with nitrogen and cooled down to room temperature. Reactor contents are centrifuged and the solids washed with methanol. Yield of total washed solids is 21.9 pounds. Solids composition is 18.5 pounds of 2,6-naphthalene dicarboxylic acid, 1.4 pounds of 6-formyl-2-naphthoic acid, and 2.2 pounds of unidentified material. Yields, based on dimethylnaphthalene charge stock are: 74.3 mole percent diacid, 6.1 mole percent aldacid, and approximately 8.8 mole percent other solids for a total recovery of 89.2 mole percent solids or 80.4 mole percent of naphthalene carboxylic acids.

Esterification 12.0 pounds of the product from the previous example containing 10.1 pounds of diacid and 0.77 pound of aldacid are charged to the reactor described in the previous example. 89 pounds of methyl alcohol and 1.5 pounds of 80% sulfuric acid are added. Reactor contents are heated to 120–130° C. and maintained at this temperature for 240 minutes after which reactor contents are cooled to approximately ambient temperature, centrifuged and washed with methanol. The methanol washed solids contain 10.6 pounds of diester plus a trace of aldester. The filtrate plus wash filtrate contain 0.8 pounds of the diester, dimethyl 2,6-naphthalenedicarboxylate, and 0.82 pound of the aldester, 6-carbomethoxy-2-naphthaldehyde. Over-all yield of ester, based on carboxylic acids in the charge is 100 mole percent. Yield of methanol-washed diester, based on diacid in charge is 93 mole percent. The diester color is darkish grey.

The invention claimed is:

1. A process for the preparation of diesters of naphthalene dicarboxylic acids which comprises oxidizing a dimethylnaphthalene with $NO_2$ and selenium dioxide in the presence of an organic solvent which is inert to $NO_2$, to form a mixture of the corresponding diacids and acid aldehydes, esterifying said mixture with a low molecular weight aliphatic alcohol of 1 to 5 carbon atoms to form a mixture of diesters and aldehyde esters of naphthalene carboxylic acid, selectively crystallizing the resulting diester and recovering the crystals of diester, thereafter recovering and oxidizing the aldehyde ester with $NO_2$ to form the corresponding half acid ester, and esterifying the half acid ester with a low molecular weight aliphatic alcohol of 1 to 5 carbon atoms to yield additional diester of naphthalene dicarboxylic acids.

2. The process according to claim 1 wherein the resulting diester is reacted with a strong base to form the corresponding naphthalene dicarboxylic acid.

3. The process according to claim 1 in which the organic solvent is trichlorobenzene.

4. The process which comprises reacting a dimethylnaphthalene with $NO_2$ and selenium dioxide in the presence of trichlorobenzene at a temperature of from about 180°–215° C., the $NO_2$ and the selenium being present in amounts just sufficient to oxidize the dimethylnaphthalene to a mixture of naphthalene dicarboxylic acids and aldehyde naphthoic acid in a ratio of about 1:1 to 1:4 by weight, esterifying said mixture with an excess of a low molecular weight aliphatic alcohol of 1 to 5 carbon atoms, thereby producing a mixture of the corresponding diester and aldehyde ester and simultaneously selectively crystallizing the diester and recovering the filter cake, recovering the aldehyde ester from the filtrate and oxidizing it with $NO_2$ in the presence of trichlorobenzene at a temperature of from about 90°–130° C., and esterifying the resulting acid ester with a low molecular weight aliphatic alcohol of 1 to 5 carbon atoms to produce additional diester of naphthalene dicarboxylic acids.

5. The process according to claim 4 wherein the selenium dioxide is prepared in situ by reacting selenium metal with $NO_2$ in trichlorobenzene prior to the addition of dimethylnaphthalene.

6. The process according to claim 4 wherein the dimethylnaphthalene is 2,6-dimethylnaphthalene and the low molecular weight alcohol is methanol, thereby forming dimethyl 2,6-naphthalene dicarboxylate.

7. The process according to claim 4 wherein the dimethylnaphthalene is 2,7-dimethylnaphthalene and the low molecular weight alcohol is methanol, thereby forming dimethyl 2,7-naphthalene dicarboxylate.

8. A process for the separation of naphthalene dicarboxylic acid from a mixture with its corresponding aldehyde naphthoic acid which comprises esterifying said mixture with an excess of a low molecular weight alcohol of 1 to 5 carbon atoms, thereby selectively crystallizing the resulting diester, and recovering the separated diester and aldehyde ester.

9. The process according to claim 8 wherein the diacid is 2,6-naphthalene dicarboxylic acid and the aldehyde naphthoic acid is 6-formyl-2-naphthoic acid.

References Cited by the Examiner

UNITED STATES PATENTS

| | | | |
|---|---|---|---|
| 2,839,575 | 6/1958 | Fetterly | 260—475 X |
| 2,887,496 | 5/1959 | Montagna et al. | 260—515 X |
| 3,042,709 | 7/1962 | Convery | 260—475 |

FOREIGN PATENTS 742,282  12/1955  Great Britain.

LORRAINE A. WEINBERGER, *Primary Examiner.*

LEON ZITVER, *Examiner.*

R. E. MASSA, T. L. GALLOWAY, *Assistant Examiners.*